March 23, 1926.
G. E. MONROE
NUT LOCK
Filed Feb. 18, 1924
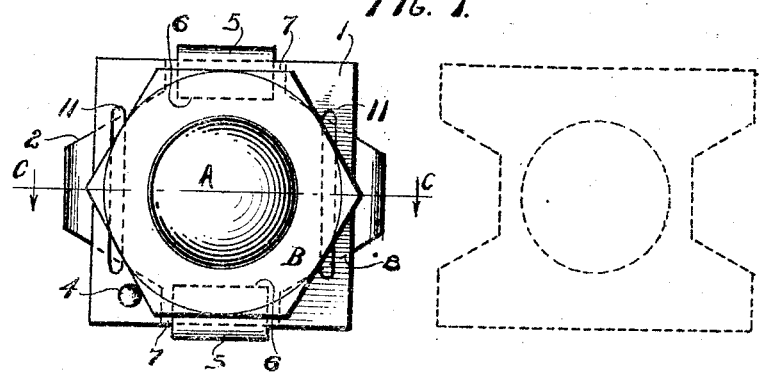
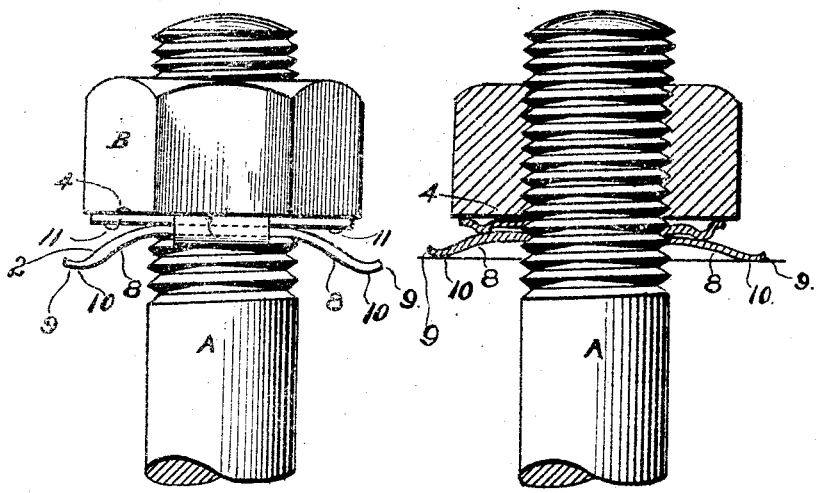
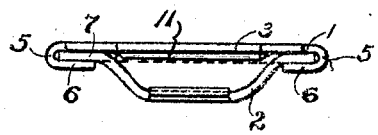
GEORGE E. MONROE, INVENTOR.
BY
Daniel Brennan, ATTORNEY.

Patented Mar. 23, 1926.

1,578,160

UNITED STATES PATENT OFFICE.

GEORGE E. MONROE, OF DETROIT, MICHIGAN.

NUT LOCK.

Application filed February 18, 1924. Serial No. 693,696.

*To all whom it may concern:*

Be it known that I, GEORGE E. MONROE, a citizen of the United States, residing at Detroit, in the county of Wayne and State of Michigan, have invented a new and useful Improvement in Nut Locks, of which the following is a specification.

This invention relates to improvements in nut locks.

It is an object of the invention to provide a nut lock in the general form of a spring washer which will effectively prevent accidental rotation of a nut after it has been tightened up on a bolt.

Another object of the invention is to provide a nut lock and spring washer primarily for securing the fastening devices of fish plates on railroad rails against accidental loosening.

Another object of the invention is to provide a nut lock which will readily absorb any vibration produced by the elements to which it is applied and which will remain in firm frictional contact with the nut, if by these vibrations or for other reasons a nut should be moved from the position to which it has been adjusted.

It is also an object of the invention to provide in a nut lock a non-circular spring washer which is securely held against rotation about the axis of the bolt or nut and which therefore locks the nut with a higher efficiency against rotation than this would be the case if an ordinary circular washer would be used.

With these and numerous other objects in view, an embodiment of the invention is illustrated in the accompanying drawing and described in the following specification. In the drawing:

Figure 1 is a top view of one embodiment of the nut and lock, with an additional plate indicated in dotted lines to indicate the other blank.

Figure 2 is a side elevation of the nut lock while applied.

Figure 3 is an end elevation of the lock detached from the nut and bolt.

Figure 4 is a section taken on line C—C of Figure 1.

The bolt A and nut B for the same may be of any desired construction.

The nut lock comprises in combination a substantially flat plate or washer 1 on which the lower surface of the nut B is seated, and a companion washer or spring member 2 which is rigidly secured to the first named plate 1 and which, in the use of the device enters into engagement with that part to which the nut and bolt are to be fastened, as for instance a fish plate, not shown in the drawing.

The plate 1 is of non-circular, preferably of rectangular, contour and is provided with the ordinary central opening 3 for the passage of the bolt A. At a suitable distance from the center of the opening 3 the plate 1 is provided with a teat or projection 4, projecting from the body of the plate 1 to such height that upon manipulation of the nut B by means of a wrench or the like the nut may travel over the teat 4 while upon accidentally loosening the nut the teat will form an obstruction against this accidental rotation of the nut in opposite direction. As will be seen from Figure 1 the teat 4 is at such distance from the axis of the central opening 3 that it engages one of the lateral surfaces of the nut when the latter is in a predetermined operative position.

The washer or plate 1 is furthermore provided at opposite sides with extensions 5 which are bent so as to provide portions 6 parallel to the body of the plate but at a sufficient distance from the lower surface of the plate 1 to hold in the channel formed between said plate and the portion 6, marginal portions 7 of the companion washer or spring member 2 which is combined with the plate 1. The portions 6 are tightly clamped against the lower surface of the extensions 7 of the companion washer 2 to prevent movement of said companion washer in any direction.

The companion washer or spring member 2 preferably is made of the highest grade of spring steel while the plate 1 is made of a different and lesser grade of spring steel. The spring member or companion washer 2 having the portions 7 inserted in the channel described, is provided with flexed extensions 8 projecting from those sides which are at right angle to the portions 7. The flexed portions 8 having the property of spring steel are of great resiliency and terminate in marginal portions 9, which again are flexed in a direction opposite to that direction in which the flexed portions 8 are bent so as to provide surface elements indicated at 10, by which the flexed portions 8 may engage the fish plate (not shown) or any other part to which the nut lock is to be applied.

Upon forcing the nut B into holding position the curvature of the flexed portions 8 will gradually be flattened out while the spring member 8 remains at the seats 10 in contact with the fish plate or other part respectively, thereby tensioning the extensions and increasing the friction with which the plate 1 is forced into engagement with the nut B. An absolute flattening of the spring member 2, however, to occupy a plane directly below the lower surface of the plate 1, is rendered impossible; when the lower surface of the portion 6 of the plate 1 enters into engagement with the part to be fastened, as for instance with a fish plate, the extensions 8 will still remain flexed to an extent determined by the thickness of the portion 6.

In order to overcome, however, even the straightening of these wings 8 to an extent in which the curvature would be determined by the thickness of the portion 6, the plate 1 is provided near those margins which overlie the flexed portions 8 with downwardly directed projections 11 against which the upper surface of the flexed members 8 will impinge when the latter are flattened out by the movement of the nut B to holding position. There will be maintained therefore continuously sufficient resiliency in this companion washer or spring member for holding the plate 1 in firm frictional contact with the nut B to prevent rotation of said nut which would otherwise be produced by the vibrations to which railroad rails and similar structures are subjected.

While in the embodiment illustrated in the drawing the spring member or companion member 2 is provided with flexed portions 8 which project outwardly midway between the lateral extensions 7, it is obvious that in the place of this arrangement of central flexed portion 8 on each side of the spring washer or companion member two flexed portions may be used. This will make it possible to punch a companion washer or spring member of the last described kind closely adjacent to a companion washer or spring member of the form shown in the drawing, with the smallest possible waste of material from the stock from which these washers are punched.

Owing to the square formation of the plate 1 and the polygonal or non-circular form of the companion washer or spring member 2, the nut B cannot turn as readily as by the use of the ordinary circular washer. The pressure of the washer or nut lock against the nut will not permit the nut to turn unless the washer or nut lock turns, and hence the present device constitutes a substitute for the ordinary washer as well as a nut lock.

The teat or dent 4 in the plate 1 naturally may be provided in this plate when the latter is punched or cut from the stock from which it is made. This teat or dent 4 greatly aids in locking the nut, for when the nut is forced down by means of a wrench or similar tool it will ride over this dent but it will not be allowed to override this dent when the nut should become slightly loosened from the position shown in Figure 1.

The lip or projection 6 for holding the companion member 2 to the plate 1 also is a valuable feature in preventing the spring member 2 from becoming entirely flattened out or compressed and thus losing its expansive power. Upon release of the force acting to flatten the curved flexed members 8 the spring will then return to the normal position illustrated in Figure 2, while the material might become crystallized and the resiliency thereof might be entirely eliminated from the spring member if it would be feasible to deform the same from the curved condition illustrated in Figure 2 in an absolutely flat condition underlying the plate 1.

It is obvious that in place of clamping the spring member or companion washer 2 to the plate 1, the parts may also be welded together in which case however, there might be danger of decreasing the resiliency which is inherent to the spring member 2.

I claim:

1. In a nut lock the combination of a substantially flat plate provided with an opening for the passage of a bolt, and a companion plate having curved extensions projecting beyond said first named plate, said first named plate and said companion plate being united at two points on opposite sides of said opening.

2. In a nut lock the combination of a substantially flat plate provided with an opening for the passage of a bolt, a companion plate having curved extensions projecting beyond said first named plate and united thereto at two points on opposite sides of said opening, and a projection on said first named plate adapted to prevent accidental rotation of a nut on said first named plate.

3. In a nut lock of the character described, a substantially flat non-circular plate provided with an opening for a bolt, and a companion plate of great resiliency and non-circular contour, said companion plate being provided with flexed resilient extensions at its ends, in combination with means for uniting said first named plate to said companion plate at its sides at two points on opposite sides of said opening.

4. A nut lock of the character described comprising a substantially flat non-circular plate provided with an opening for a bolt, and a companion plate of great resiliency and non-circular contour, said companion plate being provided with flexed resilient extensions, in combination with a projection on said first named plate adapted to prevent accidental rotation of a nut on said first named plate.

5. In a nut lock of the character described, the combination of a substantially flat plate having an opening for the bolt, said flat plate being provided with a projection adapted to prevent accidental rotation of the nut on said plate, and a companion plate firmly united with said first named plate and provided with flexed resilient extensions projecting beyond the edge of the first named plate.

6. In a nut lock of the character described, the combination of a substantially flat plate having a hole for the bolt, and a companion plate provided with flexed resilient extensions, the first named plate having wings which are bent on themselves to provide a channel for receiving marginal portions of the companion plate, the members of the channel being clamped against the surfaces of said companion plate.

7. In a nut lock of the character described, the combination of a rectangular plate provided with a central opening for the bolt, said plate having on opposite edges extensions bent on themselves to provide a channel, and a companion plate having marginal portions inserted into said channel and clamped therein, said companion plate being provided with flexed extensions of great resiliency projecting from the edges between those edges on which the marginal portions inserted into the channels are located.

8. In a nut lock of the character described, the combination of a plate having an opening for a bolt, a companion plate provided with flexed extensions of great resiliency projecting beyond said first named plate, said companion plate being firmly united with said first named plate at two points on opposite sides of said opening, and means for preventing the entire flattening of the curvature of the flexed extensions by pressure.

9. A nut lock of the character described comprising a flat plate having a hole therethrough for a bolt and united at two points on its margins and on opposite sides of said hole to the margins of a companion plate arranged below said first named plate, said companion plate having flexed extensions of great resiliency, and means below said companion plate for preventing said flexed extensions from being flattened out entirely by pressure.

10. A nut lock as described in claim 9 wherein a projection is provided on the first named plate adapted to prevent accidental rotation of a nut thereon.

11. In a nut lock of the character described, the combination of a substantially flat plate having a hole for a bolt, a companion plate firmly connected therewith and provided with flexed extensions of great resiliency, said flexed extensions terminating in marginal portions flexed in a direction opposite to that in which the main portion of the extensions are flexed.

12. In a nut lock of the character described, the combination of a substantially flat plate having an opening for a bolt, a companion plate provided with flexed extensions of great resiliency, means for preventing the entire flattening of the curvature of the flexed extensions, and a projection on said substantially flat plate adapted to prevent accidental rotation of a nut thereon.

13. In a nut lock of the character described, the combination of a substantially flat plate, a companion plate fixedly secured thereto and provided with extensions flexed downward, and means on said first named plate adapted to act on said flexed extensions for causing the same to be flexed in opposite direction upon pressure being applied against the first named plate by a nut.

In testimony whereof I affix my signature at 733 Majestic Bldg., Detroit, Michigan.

GEO. E. MONROE.